(12) United States Patent
Bileth (10) Patent No.: US 8,967,562 B1
(45) Date of Patent: Mar. 3, 2015

(54) MOUNTABLE OBJECT HOLDER

(71) Applicant: Jeffrey A. Bileth, Caledonia, MI (US)

(72) Inventor: Jeffrey A. Bileth, Caledonia, MI (US)

( * ) Notice: Subject to any disclaimer, the term of this patent is extended or adjusted under 35 U.S.C. 154(b) by 87 days.

(21) Appl. No.: 13/927,867

(22) Filed: Jun. 26, 2013

(51) Int. Cl.
*A47G 1/17* (2006.01)

(52) U.S. Cl.
USPC ............... 248/206.5; 248/311.2; 248/683; 220/23.2; 220/23.4

(58) Field of Classification Search
USPC ............ 248/206.5, 311.2, 683; 206/209.1, 206/362.1, 362.2, 362.3; 220/23.4, 254, 220/811
See application file for complete search history.

(56) References Cited

U.S. PATENT DOCUMENTS

| | | | |
|---|---|---|---|
| 5,024,067 A * | 6/1991 | Maier, II | 62/457.4 |
| 5,456,436 A | 10/1995 | Faudie | |
| 5,490,607 A | 2/1996 | Hsieh et al. | |
| 6,360,884 B1 * | 3/2002 | Smith et al. | 206/209.1 |
| 7,802,680 B2 | 9/2010 | Krebs et al. | |
| 2004/0084593 A1 * | 5/2004 | Barfield | 248/311.2 |
| 2005/0056655 A1 * | 3/2005 | Gary | 220/737 |
| 2011/0303808 A1 | 12/2011 | Bileth | |

FOREIGN PATENT DOCUMENTS

FR 2392637 6/1977

* cited by examiner

*Primary Examiner* — Amy J. Sterling
(74) *Attorney, Agent, or Firm* — Gardner, Linn, Burkhart & Flory, LLP (57) ABSTRACT

The mountable holder comprises a body having a cavity, an upper face, a first side portion, a second side portion and a back portion, with the back portion extending between the first and second side portions and the cavity defining an opening on an upper face and being useable to selectively receive objects. The holder further includes a pair of magnetic connectors, with one of the magnetic connectors extending between the back portion and the first side portion and the other magnetic connector extending between the back portion and the second side portion. The magnetic connectors operatively enable the holder to be magnetically mounted to a metallic surface when the back portion is positioned adjacent the metallic surface, and the magnetic connectors operatively enable the holder to be magnetically connectable to additional holders at the first and second side portions.

20 Claims, 13 Drawing Sheets

MOUNTABLE OBJECT HOLDER

BACKGROUND OF THE INVENTION

The present invention is directed to a device that may be used to hold objects, and in particular to a holder that is interconnectable with like configured holders and is mountable to a vertical surface.

Various items or materials stored in cans or bottles may be used in work places and residential settings. For example, operators in manufacturing settings may have beverages or containers of lubricants or sprays at or near their work stations. In addition to fluids, cans or bottles may be used to hold small parts or powders. Such items may occupy work surfaces, clutter a work area, or be positioned in inconvenient locations. Still further, small objects, writing implements, parts or other items that are not held in a separate can or bottle may also need to be retained.

SUMMARY OF THE INVENTION

The present invention provides a device for holding and organizing objects, including cans, bottles, writing instruments, tools, parts or any of various objects, with the holder enabling such objects to be conveniently mounted for ease of use or access.

In one embodiment of the present invention, a mountable object holder comprises a body having a cavity, an upper face, a first side portion, a second side portion and a back portion, with the back portion extending between the first and second side portions and the cavity defining an opening on an upper face. The holder further includes a pair of magnetic connectors, with one of the magnetic connectors extending between the back portion and the first side portion and the other magnetic connector extending between the back portion and the second side portion. The magnetic connectors operatively enable the holder to be magnetically mounted to a metallic surface when the back portion is positioned adjacent the metallic surface, and the magnetic connectors operatively enable the holder to be magnetically connectable to additional holders at the first and second side portions.

The body may further include a pair of connector cavities within which the magnetic connectors are located, where the connector cavities form openings on the back portion and first and second side portions. The magnetic connectors may have a curved shape, and in a particular embodiment include a magnet and a curved magnetic member formed from steel that is magnetized by the magnet, with the magnet being exposed at the back portion and the magnetic members being exposed on the first and second side portions. In accordance with a further particular embodiment, the holder includes a second pair of magnetic connectors located within additional connector cavities.

The magnetic connectors may include a projection, such as a convex end, at the first side of the body and include a socket or receptacle, such as a concave end, at the second side of the body. Accordingly, like configured holders may be interconnected in aligned, adjacent relationship.

The holders thus provide a convenient storage retainer for various objects and may be used without requiring the usage of horizontal surfaces, where the connecting members of the side portions enable two or more can holders to be organized together in interconnected formation. Magnets on the back portions of the holders may be used to enable the can holders to be mounted to generally vertical metallic surfaces, such as work benches, tool boxes, cabinets or desks. Accordingly, the holders provide convenient and organized storage for objects such as cans, bottles, parts, tools and/or other components or objects that might be stored within the holders.

These and other objects, advantages, purposes and features of this invention will become apparent upon review of the following specification in conjunction with the drawings.

DESCRIPTION OF THE PREFERRED EMBODIMENTS

Figure 1:
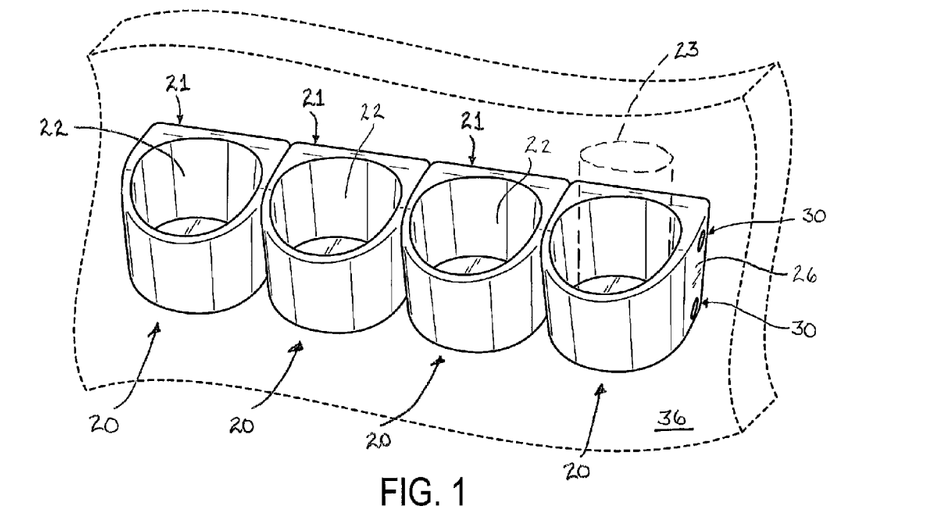
FIG. 1 is a front perspective view of a series of interconnected holders in accordance with an aspect of the present invention shown mounted to a generally vertical surface.
Figure 2:
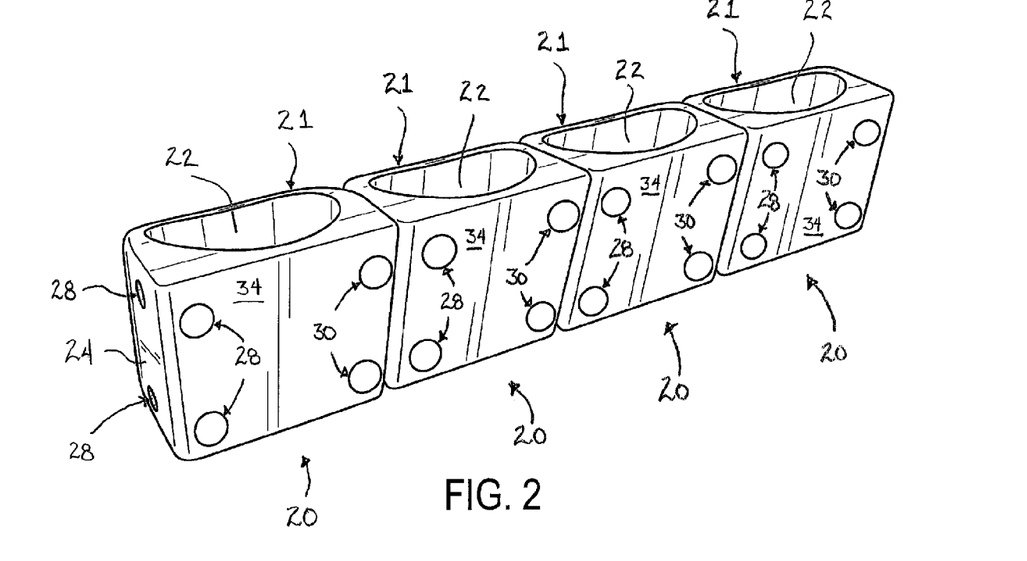
FIG. 2 is a rear perspective view of the interconnected holders of FIG. 1 shown removed from the generally vertical surface.
Figure 3A:
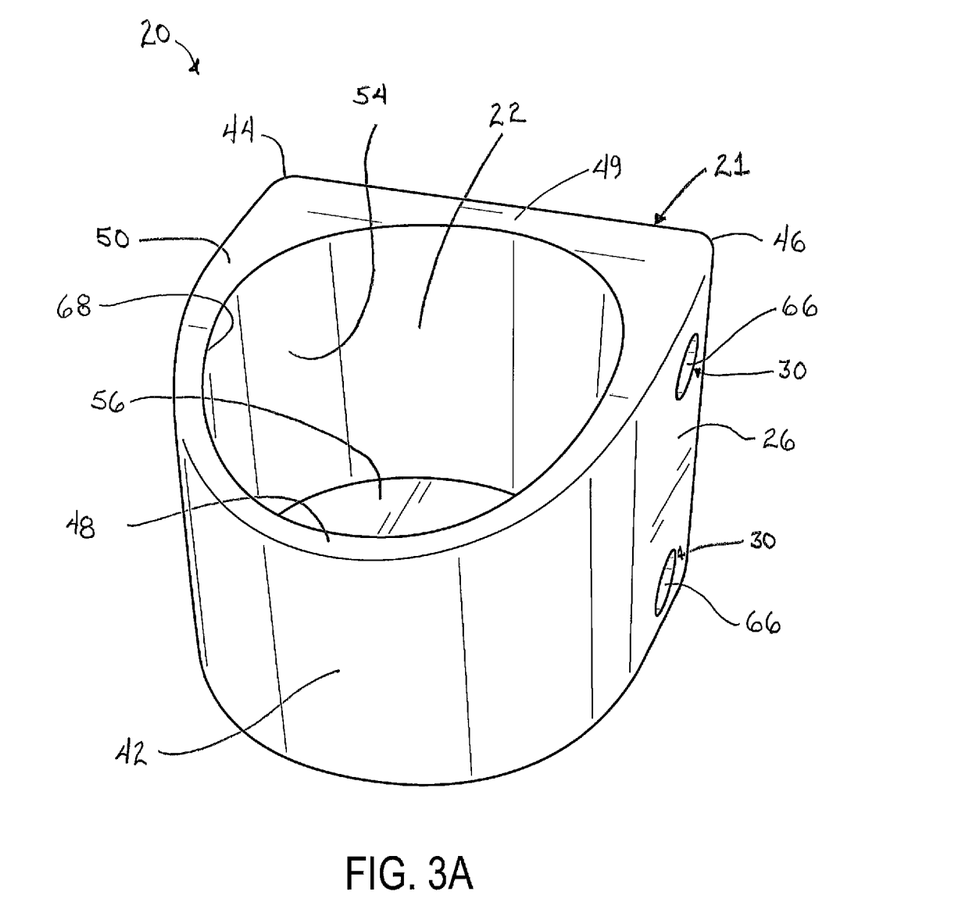
FIG. 3A is a front perspective view of a single holder in accordance with an aspect of the present invention.
Figure 3B:
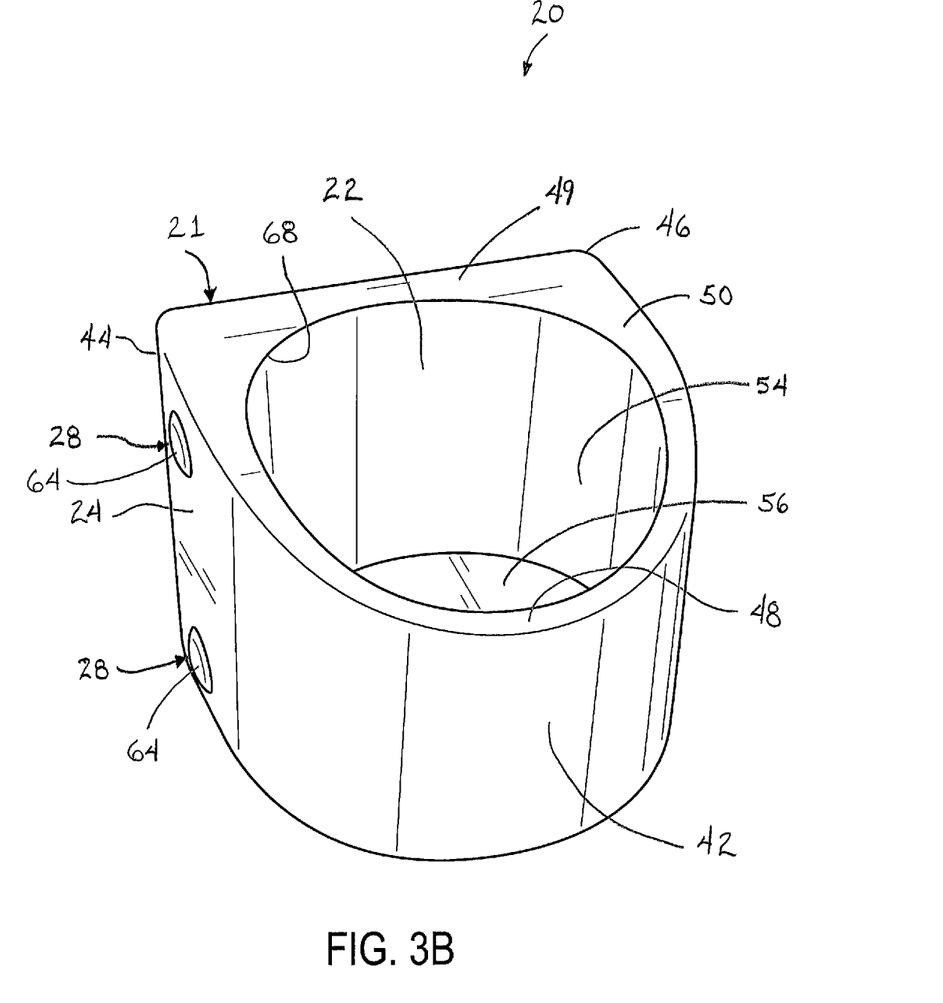
FIG. 3B is a front perspective view of the holder of FIG. 3A shown from an opposite side angle.
Figure 4A:
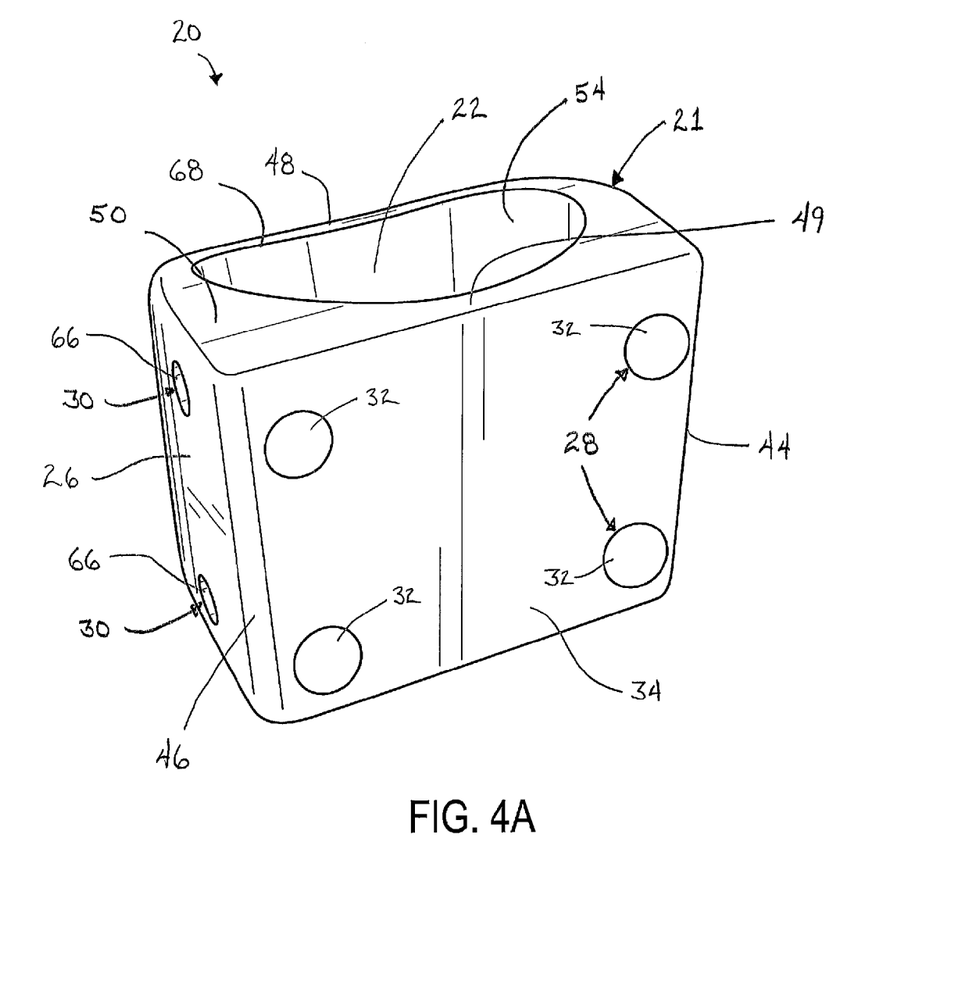
FIG. 4A is a rear perspective view of the holder of FIG. 3A.
Figure 4B:
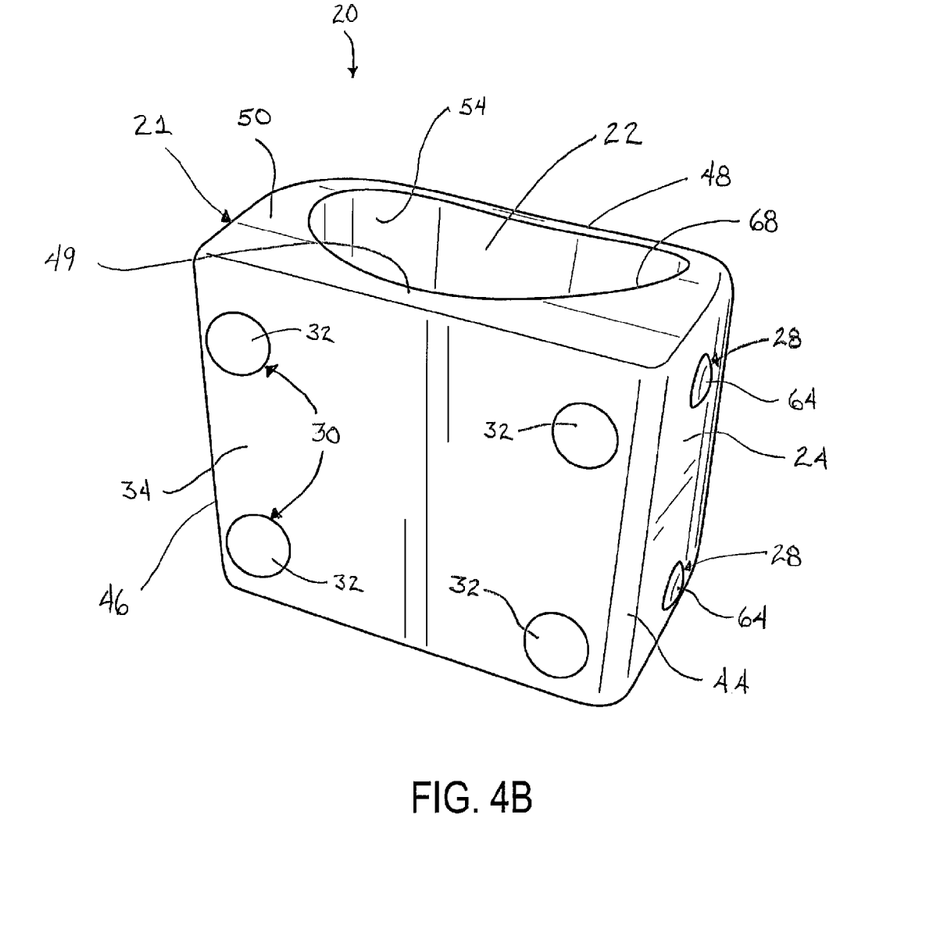
FIG. 4B is a rear perspective view of the holder of FIG. 3A shown from an opposite side angle relative to FIG. 4A.
Figure 5:
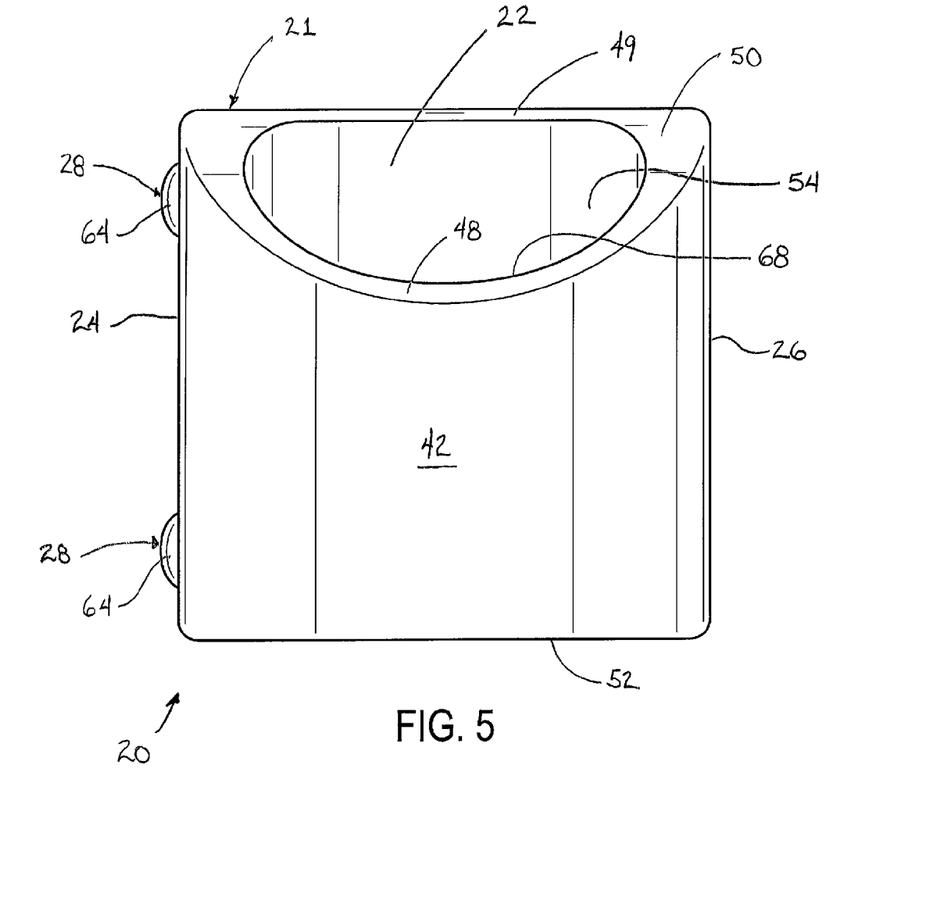
FIG. 5 is a front elevation view of the holder of FIG. 3A.
Figure 6:
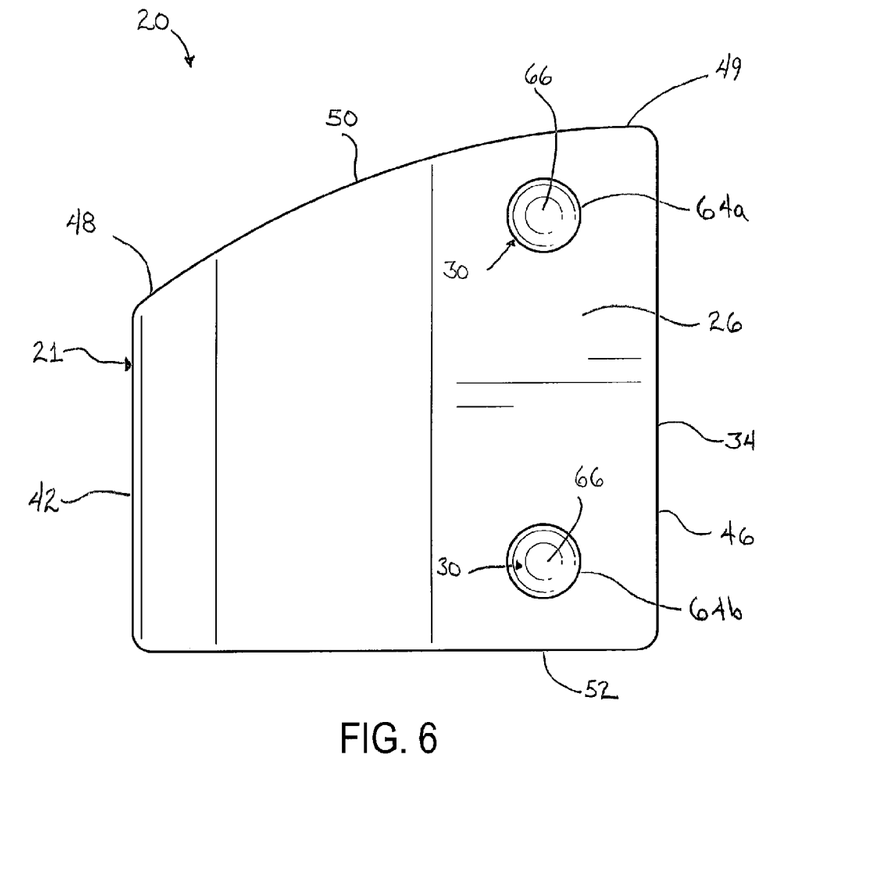
FIG. 6 is a right side elevation view of the holder of FIG. 3A.
Figure 7:
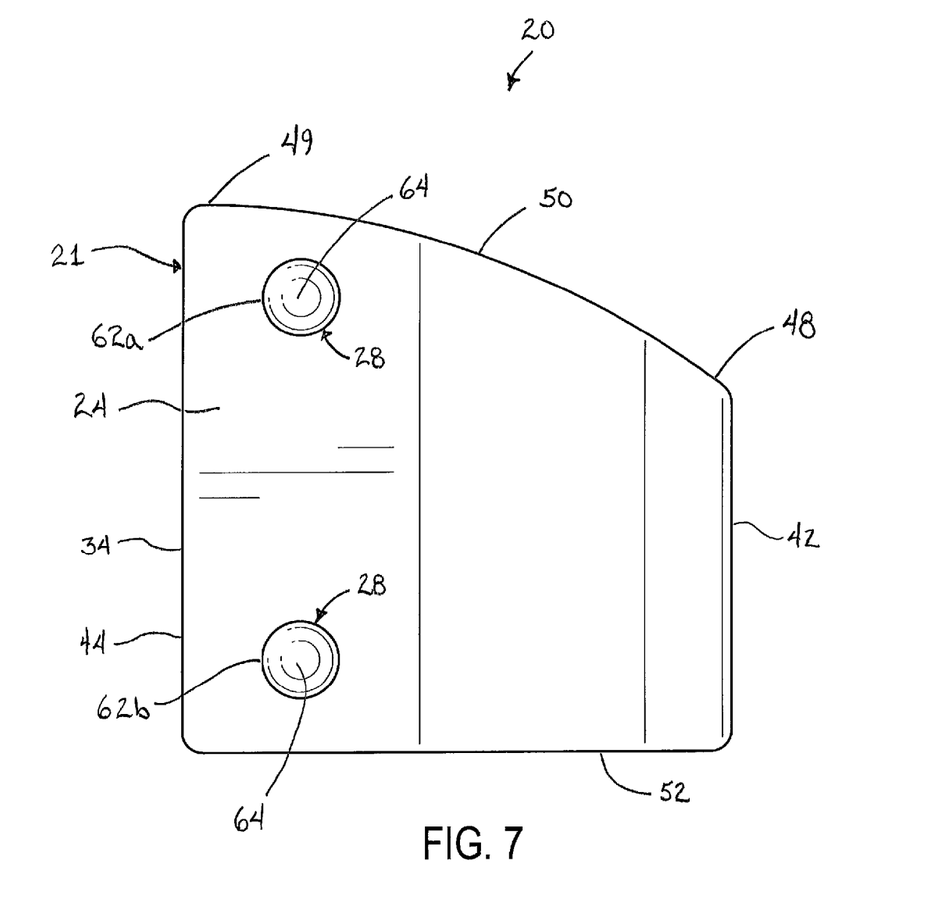
FIG. 7 is a left side elevation view of the holder of FIG. 3A.

The present invention will now be described with reference to the accompanying figures, wherein the numbered elements in the following written description correspond to like-numbered elements in the figures. FIGS. 1 and 2 disclose four interconnected holders 20 in accordance with the present invention, with each holder 20 comprising a body 21 having a cavity 22 for receiving objects, such as a can or bottle 23 or the like.

With further reference to FIGS. 3A-4B, each holder 20 includes opposed sides or surfaces 24 and 26 on body 21, with the sides 24, 26 including exposed magnetic connectors 28 and 30, respectively, whereby the magnetic connectors 28 on side 24 of one holder 20 are connectable to the magnetic connectors 30 on side 26 of another holder 20 such that the holders 20 may be interconnected in adjacent relationship as shown in FIGS. 1 and 2. The magnetic connectors 28, 30 of each holder 20 are also exposed on the back side 34 of the holders 20 such that a single holder 20, or multiple interconnected holders 20 as shown in FIGS. 1 and 2, may be mounted to a metallic surface 36, such as a tool box, cabinet, appliance, machinery or the like. As discussed in detail below, in the illustrated embodiment the magnetic connectors 28, comprise magnets 32 and magnetic members 38, 40 (FIGS. 8, 9, 11 and 12) that are disposed within bodies 21 and are exposed on sides 24, 26 and 34, with the magnets 32 being positioned at the back side 34 to thereby operate as mounting members.

As shown in FIGS. 3A-10 of the illustrated embodiment, body 21 includes a rounded front portion 42 that joins with planar side portions 24, 26. Body 21 further includes a back portion or surface or side 34, with back 34 also being planar and extending between side portions 24, 26 to form corners 44, 46. Body 21 also includes a top side or surface 50 with a front top edge 48 that is lower than a back top edge 49. Body 21 also includes a planar bottom side or surface 52, with cavity 22 being cylindrical and formed in top side 50 by an internal side wall 54 and a bottom wall 56. It should be appreciated, however, that alternative configurations of body 21 may be employed within the scope of the present invention including, for example, a generally cubical body or otherwise. Moreover, cavity 22 need not be cylindrical and/or multiple cavities may be employed.

As noted, body 21 further includes connectors 28 and 30, where connectors 28 are positioned within cavities 58a, 58b of body 21 and connectors 30 are positioned within cavities 60a, 60b of body 21. (See FIGS. 8 and 9). Cavities 58a, 58b form openings 61a, 61b on back portion 34 and form openings 62a, 62b on side 24. (See FIGS. 7 and 10). Correspondingly, cavities 60a, 60b form openings 63a, 63b on back portion 34 and form openings 64a, 64b on side 26. (See FIGS. 6 and 10). In the illustrated embodiment the cavities 58, 60 are U-shaped tubular cavities. Connectors 28 are exposed on side 24 and back 34, and connectors 30 are exposed on side 26 and back 34, where in the illustrated embodiment body 21 includes two connectors 28 and two connectors 30. As understood from FIGS. 8, 9, 11 and 12, connectors 28 and 30 are generally U-shaped whereby they include an exposed portion on both sides 24, 26 and back side 34. Still further connector 28 comprises a magnet 32 that contacts magnetic member 38 and connector 30 comprises a magnet 32 that contacts magnetic member 40. In the illustrated embodiment, magnets 32 are disk shaped and comprise conventional ND0421-42NM magnets supplied by CMS Magnetics Inc. of Plano, Tex. When positioned within cavities 58a, 58b, 60a, 60b each magnet 32 includes an exposed planar face 67 (FIG. 10) on back side 34 of body 21, with an opposite planar face of magnet 32 being joined with a corresponding planar face of the respective magnetic member 38, 40. When so joined with magnets 32, magnetic members 38, 40 become magnetized and thereby themselves operate as magnets as is conventionally known to aid in the interconnection of holder 20 with adjacent holders 20 at sides 24, 26.

Magnetic members 38, 40 in the illustrated embodiment are constructed of steel and have a generally cylindrical U-shape in the manner of a curved cylinder. It should be appreciated that members 38, 40 need not themselves be magnetic, but rather may be magnetized by way of interaction with magnets 32. As shown, magnetic member 38 includes a convex end forming a projection 64 that extends beyond a plane defining side 24 based on the positioning of magnetic member 38 within cavity 58. Conversely, magnetic member 40 includes a concave end forming a socket or receptacle 66, where receptacle 66 is recessed from the plane defining side 26.

Accordingly, receptacles 66 of connectors 30 of one holder 20 are adapted to receive or mate with projections 64 of connectors 28 of an adjacent holder 20, with the polarity of the magnets 32 arranged whereby the magnetic members 38 and 40 of the adjacent holders 20 being magnetically attracted to each other to provide a magnetic force joining the adjacent holders 20 together. Thus, one holder 20 may be connected to another holder 20 in adjacent relationship by magnetic interconnection, with the mating of the projections 64 and sockets 66 aiding the longitudinal alignment of the holders 20 together whereby the bottom surfaces 52 and top edges 49 of adjacent, interconnected holders 20 are substantially aligned. Still further, one holder 20 may be joined to a holder 20 that is already mounted to a surface 36 without the mounted holder 20 having to first be removed.

It should be appreciated, however, that alternatively formed connectors may be employed within the scope of the present invention. For example, alternatively configured magnetic members and/or magnets may be employed that form connectors between the sides and back of the holders. Still further, the connectors may be formed to have alternatively configured projections and sockets.

Figure 8:
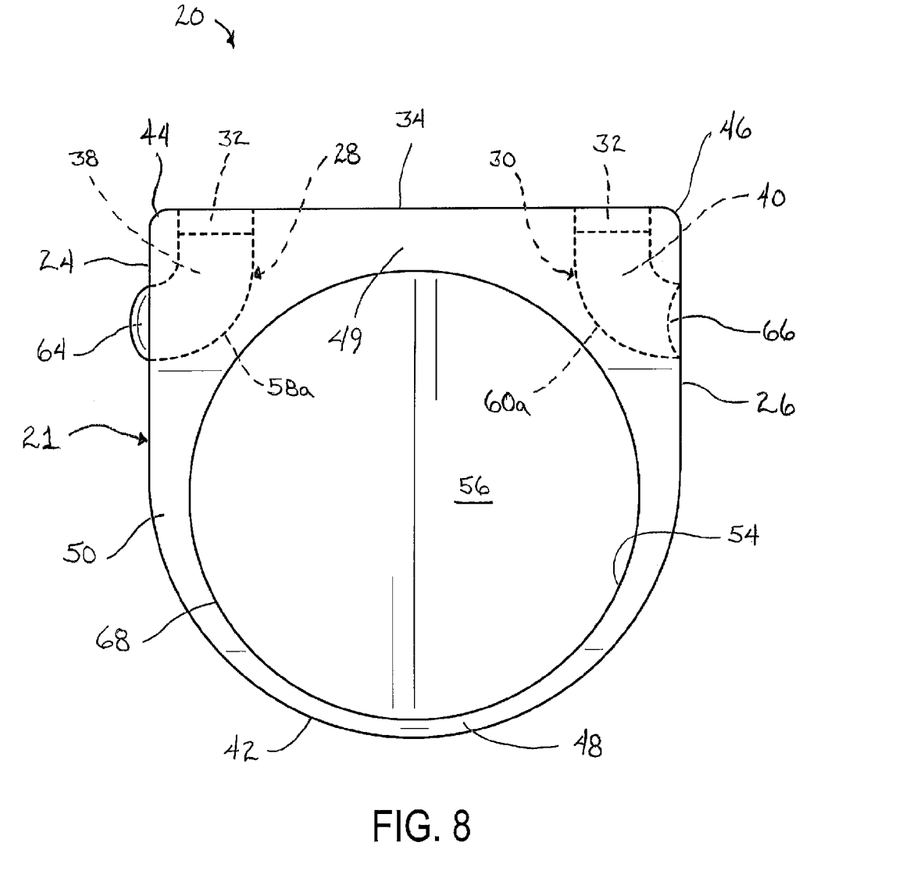
FIG. 8 is a top plan view of the holder of FIG. 3A.
Figure 9:
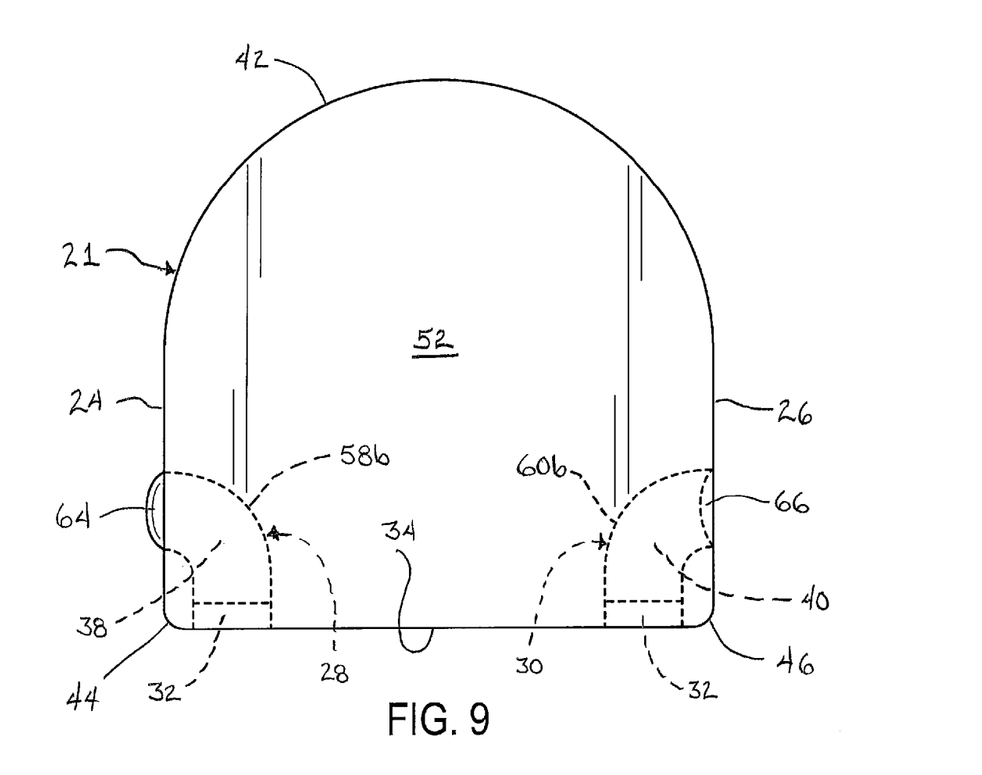
FIG. 9 is a bottom plan view of the holder of FIG. 3A.
Figure 10:
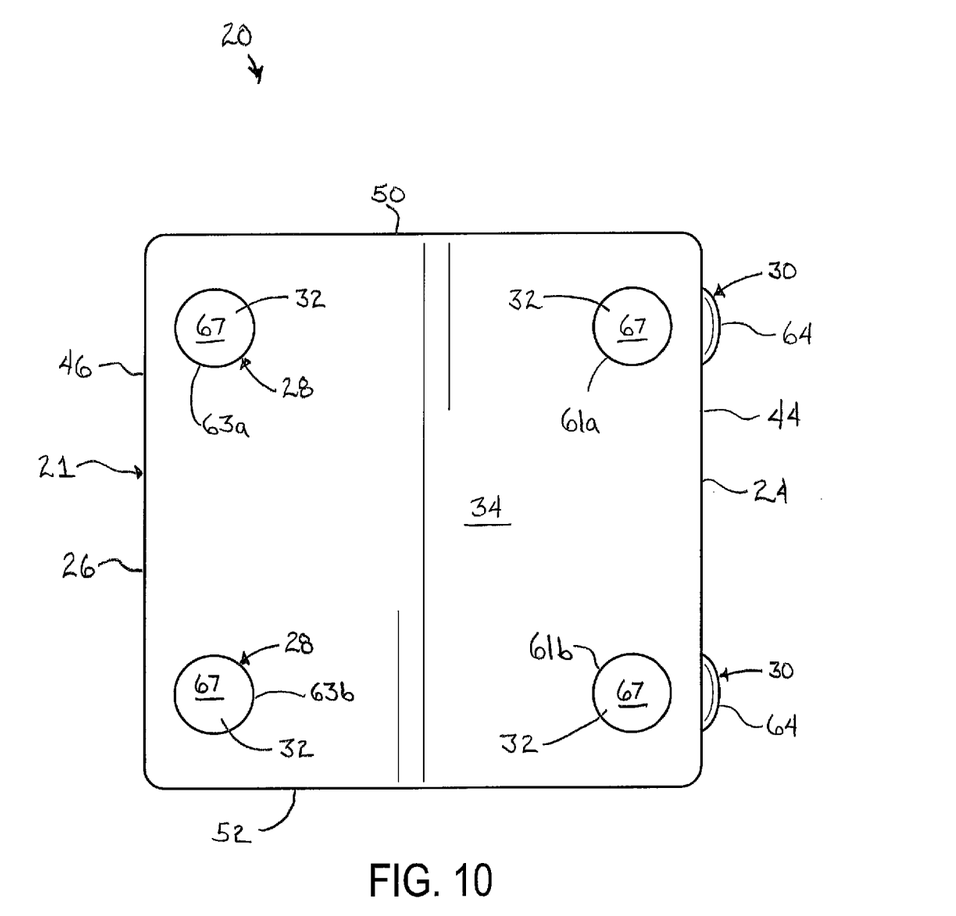
FIG. 10 is a rear elevation view of the holder of FIG. 3A.
Figure 11:
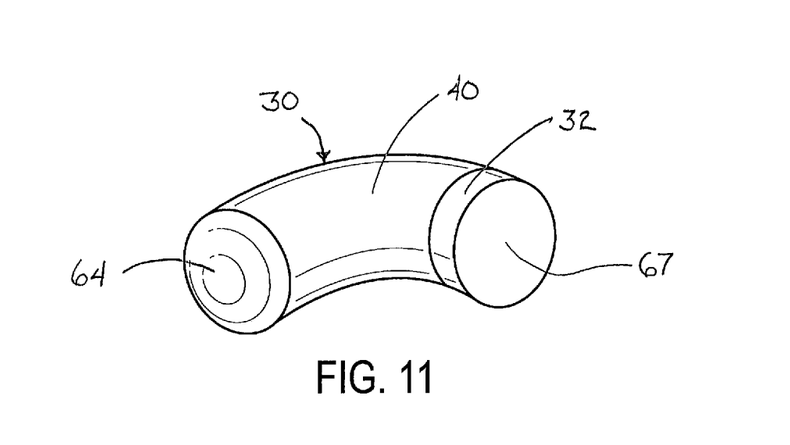
FIG. 11 is a perspective view of a left side connector member removed from the holder of FIG. 3A.
Figure 12:
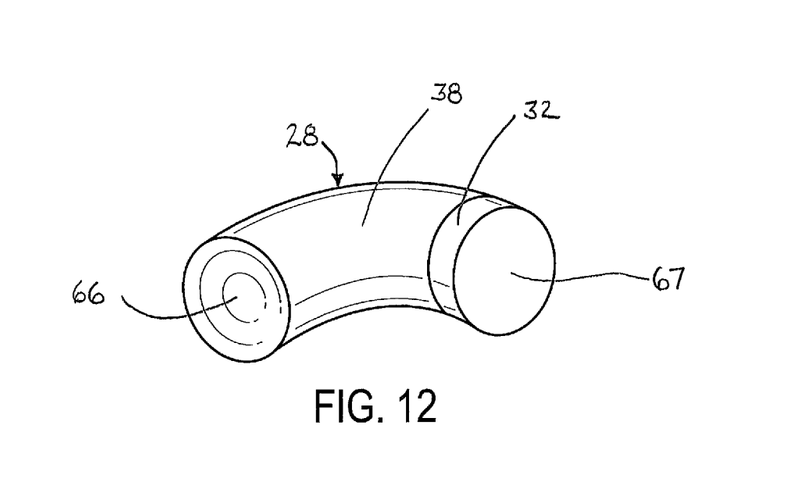
FIG. 12 is a perspective view of a right side connector member removed from the holder of FIG. 3A.

The holders 20 of the illustrated embodiment may be constructed from wood, plastic or polymeric materials, with side portion 24 and side portion 26 forming distally opposed sides, that in the illustrated embodiment include portions that are generally planar and generally parallel to one another. The holders 20 further include a top portion or top surface 50, with cavity 22 forming a cavity opening 68 in top surface 50 and having a cavity sidewall 54 and cavity bottom 56 (FIG. 8). Each holder 20 further includes a front surface or portion 42 and a bottom surface or portion 52, with the planar portions of sides 24 and 26 being generally orthogonal to back portion 34 and bottom surface 52, whereby back portion 34 is also generally orthogonal to bottom surface 52.

As noted, back portion or surface 34 includes multiple magnets 32 that operate as mounting members. Magnets 34 are disk shaped and mounted within cavities 58, 60 at openings 61, 63, such as by press fitting or gluing magnets 34 therein whereby the exposed surface 67 (FIG. 10) of the magnets 34 is approximately flush with back surface 34. Alternatively shaped magnets may be employed and, still further, a holder may be constructed to include more or fewer than four magnets and/or more or fewer than four magnetic connectors.

The holder of the present invention provides a convenient storage retainer for cans, bottles or other objects, and may be utilized without taking up horizontal surface space. A single holder may be used by itself or two or more holders may be used together, including more than four as illustrated in FIGS. 1 and 2. Still further, although holders are disclosed as being generally cubical, alternative shapes may be employed. The connectors further enable two or more holders to be organized together in interconnected formation, with the magnets of the connectors, or alternative magnets installed to the back portion of the holders, enabling the holders to be mounted to metallic surfaces, such as work benches or tool boxes. Accordingly, the holders provide convenient and organized storage for can, bottles, and other parts and/or components that might be stored within the holders.

Changes and modifications in the specifically described embodiments can be carried out without departing from the principles of the present invention which is intended to be limited only by the scope of the appended claims, as interpreted according to the principles of patent law including the doctrine of equivalents.

I claim:

1. A mountable holder, said holder comprising:
a body having a cavity, an upper face, a first side portion, a second side portion and a back portion, said back portion extending between said first side portion and said second side portion with said cavity defining a cavity opening on said upper face whereby said cavity is useable to selectively receive objects; and
a pair of magnetic connectors, one of said magnetic connectors extending between said back portion and said first side portion and the other said magnetic connector extending between said back portion and said second side portion;
whereby said magnetic connectors operatively enable said holder to be magnetically mounted to a metallic surface when said back portion is positioned adjacent the metallic surface, and said magnetic connectors operatively enable said holder to be magnetically connectable to additional holders at said first side portion and said second side portion.

2. The holder of claim 1, wherein said body further includes a pair of connector cavities within which said magnetic connectors are located, one of said connector cavities forming an opening on said back portion and said first side portion and the other said connector cavity forming an opening on said back portion and said second side portion.

3. The holder of claim 1, wherein each said magnetic connector includes a magnet and a magnetic member.

4. The holder of claim 3, wherein said magnets are exposed at said back portion and wherein respective ones of said magnetic members are exposed at said first side portion and said second side portion.

5. The holder of claim 4, wherein said magnetic members comprise steel.

6. The holder of claim 4, wherein said magnetic members are curved.

7. The holder of claim 1, wherein said magnetic connectors are curved.

8. The holder of claim 1, further including a second pair of magnetic connectors, wherein one said magnetic connector of said second pair of magnetic connectors extends between said back portion and said first side portion and the other said magnetic connector of said second pair of magnetic connectors extends between said back portion and said second side portion.

9. The holder of claim 8, wherein said body includes a plurality of connector cavities and within each of which one of said magnetic connectors is located.

10. The holder of claim 1, wherein said magnetic connector extending between said back portion and said first side portion includes a projection at said first side portion, and wherein said magnetic connector extending between said back portion and said second side portion includes a receptacle at said second side portion.

11. The holder of claim 10, wherein said projection comprises a convex end of the respective said magnetic connector, and wherein said receptacle comprises a concave end of the respective said magnetic connector.

12. Interconnectable holders comprising:
a plurality of holders, each said holder comprising;
a body having a cavity, an upper face, a first side portion, a second side portion and a back portion, said back portion extending between said first side portion and said second side portion, said cavity defining a cavity opening on said upper face with said cavity being useable to selectively receive objects; and
a first magnetic connector and a second magnetic connector, said first magnetic connector extending between said back portion and said first side portion and said second magnetic connector extending between said back portion and said second side portion;
said holders being magnetically mountable to a metallic surface via said first magnetic connector and said second magnetic connector when said back portion is positioned adjacent the metallic surface, and wherein said first magnetic connector of each said holder is connectable to said second magnetic connector of another said holder whereby said first side portion of one said holder is connected to said second side portion of an adjacent said holder.

13. The holders of claim 12, wherein each said body further includes a pair of connector cavities, one of said connector cavities forming an opening on said back portion and said first side portion and within which said first magnetic connector is located, and the other said connector cavity forming an opening on said back portion and said second side portion and within which said second magnetic connector is located.

14. The holders of claim 12, wherein said first magnetic connector includes a projection at said first side portion, and wherein said second magnetic connector includes a receptacle at said second side portion.

15. The holders of claim 14, wherein said projection comprises a convex end of said first magnetic connector, and wherein said receptacle comprises a concave end of said second magnetic connector.

16. The holders of claim 12, wherein each said holder further includes a third magnetic connector and a fourth magnetic connector, said third magnetic connector extending between said back portion and said first side portion and said fourth magnetic connector extending between said back portion and said second side portion.

17. A mountable holder, said holder comprising:
a body having a cavity, an upper face, a first side portion, a second side portion and a back portion, said back portion extending between said first side portion and said second side portion, and said cavity defining a cavity opening on said upper face with said cavity being useable to selectively receive objects; and
a first magnetic connector and a second magnetic connector, said first magnetic connector extending between said back portion and said first side portion and said second magnetic connector extending between said back portion and said second side portion;
said body further including a first connector cavity and a second connector cavity, said first connector cavity forming an opening on said back portion and said first side portion and within which said first magnetic connector is located, and said second connector cavity forming an opening on said back portion and said second side portion and within which said second magnetic connector is located;
whereby said first magnetic connector and said second magnetic connector operatively enable said holder to be magnetically mounted to a metallic surface when said back portion is positioned adjacent the metallic surface, and whereby said first magnetic connector and said second magnetic connector operatively enable said holder to be magnetically connected to like configured holders at said first side portion and said second side portion, respectively.

18. The holder of claim 17, wherein said first magnetic connector includes a projection at said first side portion, and wherein said second magnetic connector includes a receptacle at said second side portion.

19. The holder of claim 17, further including a third magnetic connector and a fourth magnetic connector and wherein said body includes a third connector cavity and a fourth connector cavity, said third connector cavity forming an opening on said back portion and said first side portion and within which said third magnetic connector is located, and said fourth connector cavity forming an opening on said back portion and said second side portion and within which said fourth magnetic connector is located.

20. The holder of claim 19, wherein said first magnetic connector and said third magnetic connector each include a projection at said first side portion, and wherein said second magnetic connector and said fourth magnetic connector each include a receptacle at said second side portion.

* * * * *